Oct. 27, 1925.
G. E. MARTS
1,558,697
FOOT PEDAL EXTENSION
Filed July 22, 1924
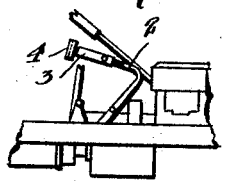
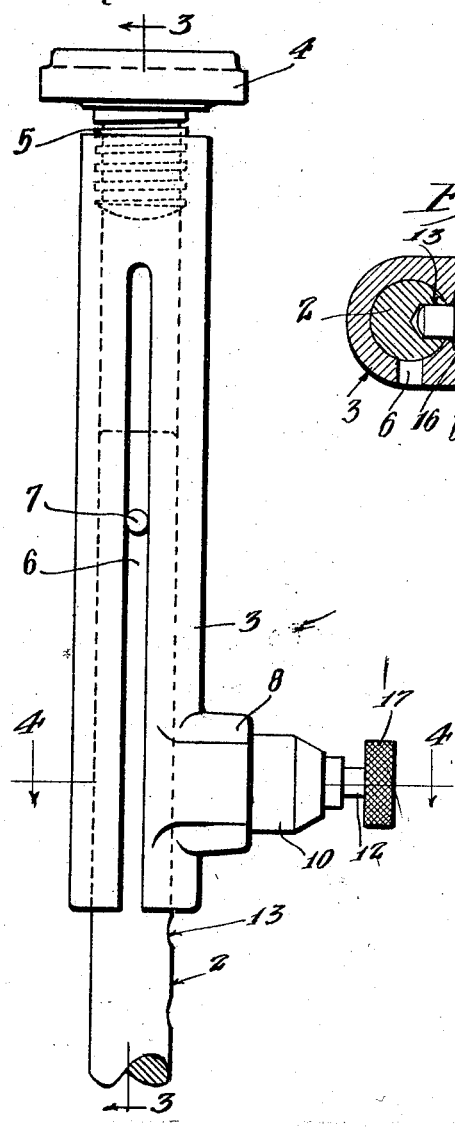
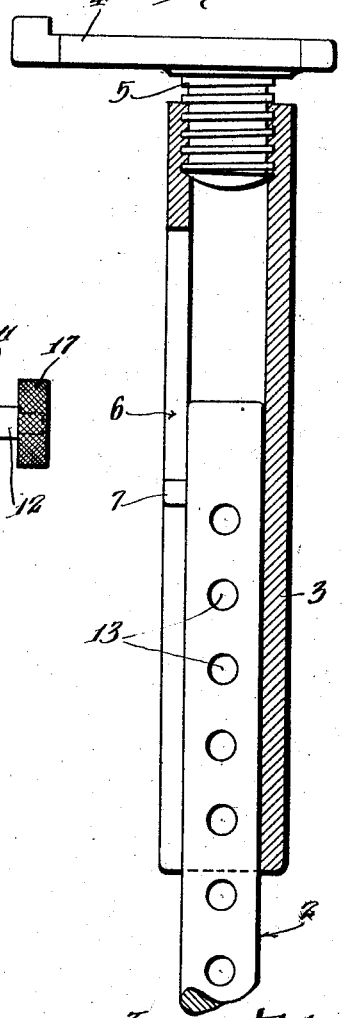
Inventor,
George E. Marts
By Lyon & Lyon attys Patented Oct. 27, 1925.

1,558,697

UNITED STATES PATENT OFFICE.

GEORGE E. MARTS, OF LONG BEACH, CALIFORNIA.

FOOT-PEDAL EXTENSION.

Application filed July 22, 1924. Serial No. 727,435.

*To all whom it may concern:*

Be it known that I, GEORGE E. MARTS, a citizen of the United States, residing at Long Beach, in the county of Los Angeles and State of California, have invented a new and useful Foot-Pedal Extension, of which the following is a specification.

An object of the present invention is to provide a means by which these foot pedals, which control the brake, clutch or other parts of the control mechanism of such a vehicle, can be adjusted at different positions upon the rods mounting the pedals, so that these foot pedals can be set in any desired position by the operator of such vehicles, and accordingly the driving mechanism of the vehicles brought into the most comfortable position for various operators of the same vehicle. When as in the customary vehicle the foot pedals are attached in permanent manner to the rods mounting the same, they can be in position best adapted for only certain drivers of the vehicles— parties taller or shorter will find the pedals in an uncomfortable position. By this invention, these foot pedals can be adjusted without difficulty for each driver of the vehicle.

By mounting the foot pedals adjusted upon the rods, other advantages are obtained. For example, when the foot pedal is employed to control the brakes of the vehicle, wear of the brake bands or other causes frequently changes the position to which the operating rods must be moved to apply the brake. Such changes can be compensated for by the use of the foot pedal extension of this invention.

Various other objects and advantages of the invention will be apparent from the description of a preferred form of a foot pedal extension embodying the invention, for which purpose reference is made to the accompanying drawings, in which the foot pedal extension is shown in its preferred form.

In the drawings,

Figure 1 is a diagrammatical view of foot pedal extensions as applied to the operating rod of a vehicle.

Fig. 2 is an elevation of the foot pedal extension.

Fig. 3 is a similar elevation, mainly in section on the line 3—3 of Fig. 2, and

Fig. 4 is a transverse section mainly on the line 4—4 of Fig. 2.

Referring to the drawing, in Fig. 1 certain of the parts of the vehicle are diagrammatically indicated showing positions of the operating rod 2 with which the foot pedal extension is associated. Such operating rod in use is customarily employed for actuating either the brake, clutch or other devices or mechanism of the vehicle, it being understood that the term "vehicle operating rod" as hereinafter used is intended to include such rods as are associated with clutch brakes and the like, by which such parts may be operated to control the vehicle from a foot pedal.

The operating rod 2 is shown telescoped within a tubular rod 3 carrying a foot pedal 4, the foot pedal 4 may, if desired, be integral with the rod 3. The particular form of the extension, however, discloses the pedal 4 as having a threaded stem 5 threaded within the rod 3. The rods 2 and 3 have a sliding fit, so that they are relatively movable longitudinally to adjust the position of the pedal 4. 6 indicates a slot extended from the lower end of the tubular rod 3 longitudinally near the upper end of the rod and the operating rod 3 is indicated as provided with a pin 7 slidably fitting the slot 6. The slot 6 and pin 7 thus provide one form of means operative to prevent the pedal 4 rotating on the operating rod 2, it being understood that various other means to accomplish this purpose may readily be provided, such as providing a flat face on the operating rod 2 engaging the similar flat face upon the rod 3 connected with the pedal 4.

8 indicates a boss extending laterally from near the lower end of the rod 3, said boss being threaded as indicated at 9 to receive a housing 10, the housing 10, in turn, having a bore 11 mounting a dog 12 which extends radially from the operating rod 2. The dog 12 is designed to fit in any one of a series of longitudinally spaced recesses 13 in the operating rod 2, and when engaging any one of said recesses 13 positively locks the foot pedal 4 and rod 3 from longitudinal movement with respect to the operating rod 2. The housing 10 provides a bore enlarged in the direction of the rod 2, as indicated at 14, to receive a compression spring 15, coiled around the dog 12, for yieldingly urging the dog towards the operating rod 2. The dog 12 has an enlargement 16 for fitting enlarged bore 15 to positively guide the dog 12 in the housing 10.

The outer end of the dog 12 is provided with a handle 17 by which the dog may be pulled out of engagement with the recesses 13 of the operating rod 2 so that the pedal 4 and rod 3 may be shifted longitudinally with respect to the operating rod 2 to adjust the position of the pedal 4, it being understood that the dog 4 is permitted to again enter one of the recesses 13 to maintain the pedal 4 in the adjusted position. During such shifting of the pedal 4, it is seen that pin 7 prevents rotation of the pedal 4 with respect to the rod 2, thus facilitating the movement of the dog 12 to position where it may engage in the desired recess 13 of the operating rod 2.

By the foot pedal extension herein shown, it can be readily seen that the pedal 4 may be adjusted at will to any desired position, and hence the pedal brought into the most desirable position for each operator of the vehicle.

While the foot pedal extension herein described is well suited for accomplishing the purposes of this invention, it is understood that various modifications may be made without departing from the spirit of the invention, and the invention is not limited to the specific embodiment shown, but is of the scope set forth in the accompanying claim.

I claim:

In a foot pedal extension, the combination of an operating rod, a split hollow rod carrying a pedal telescoped over the first rod and slidable thereon, the first rod having a series of recesses, a dog carried by the hollow rod and provided with an operating handle, a spring yieldingly urging the dog towards the recesses, and a pin on the operating rod guidably engaging the split in said hollow rod.

Signed at Los Angeles, California, this 14th day of July, 1924.

GEORGE E. MARTS.